Patented Dec. 1, 1931

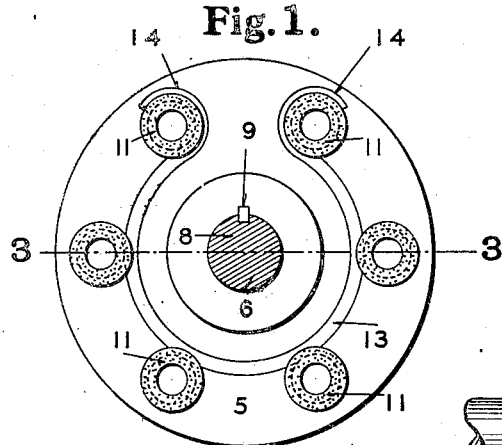
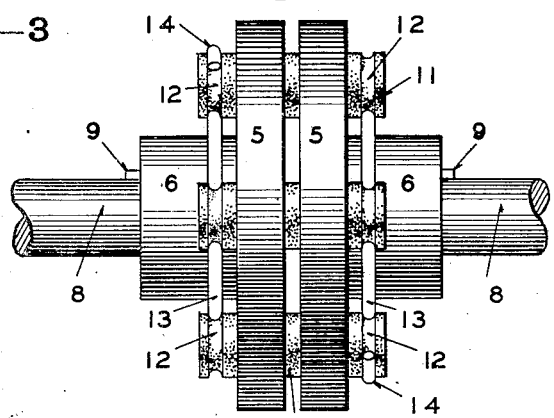
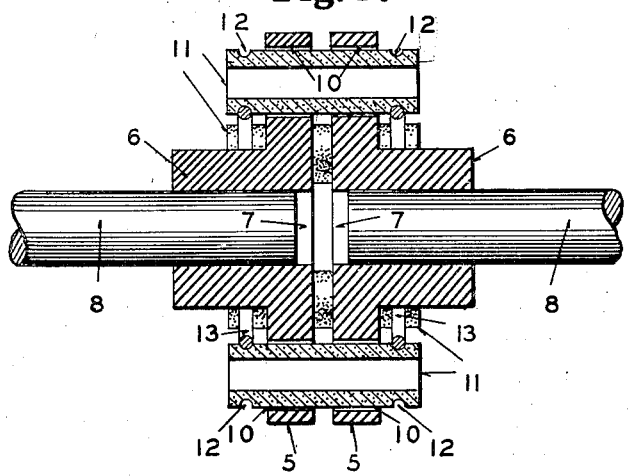

1,834,521

UNITED STATES PATENT OFFICE

ALBERT F. FROUSSARD, OF ST. LOUIS, MISSOURI

SHAFT COUPLING

Application filed November 12, 1928. Serial No. 318,611.

My invention relates to a shaft coupling of the pin and disk type and has for one of its objects the production of a coupling which will be simple in construction and which can be connected or disconnected without the use of screws or bolts.

Another object of my invention is to provide a coupling which may be used to connect shafts slightly out of alignment and which will be noiseless in operation.

In the accompanying drawings, which illustrate one form of coupling made in accordance with my invention, Figure 1 is an end view; Figure 2 is a side elevation; and Figure 3 is a section taken on the line 3—3 of Figure 1.

My coupling comprises two similar disks 5 each provided with a hub 6 and having a central opening 7 for the reception of the end of one of the shafts 8 which are to be connected. The disks are prevented from rotating with respect to the shafts by keys 9 or any other suitable means.

Formed in each disk are a number of holes 10, the holes in the two disks being in alignment so that they may be connected by pins 11. While the number of pins may vary I prefer to use six, as shown in the drawings. The pins are made somewhat less in diameter than the holes 10, as shown in Figure 3, to permit the coupling of shafts slightly out of alignment. This is of special importance in cases where the shafts are supported in bearings at each side of and close to the coupling and where consequently the spring of the shafts cannot be utilized to correct the lack of alignment. Though the necessary difference between the diameter of the pins and the holes is usually quite small, the coupling would be noisy in operation if the pins where made of metal. I therefore make them of some non-metallic material, preferably fiber. While the pins may be solid I prefer to make them tubular in form as shown.

The pins are of such length as to project some distance from the face of the disk at each side and each is provided with a pair of annular grooves 12, one adjacent to each end of the pin. Engaging the grooves 12 are a pair of rings 13 of spring wire of such size as to fit within the pins, as shown in Figure 1, and each provided with a pair of hooks 14 to embrace two of the pins to prevent its accidental displacement. The rings may be placed in position to lock, or removed to release the pins by forcing the hooks 14 toward each other until the size of the ring is reduced to less than the circle defined by the pins and no additional pins or screws are necessary to hold the rings in position as this is accomplished by the resilience of the ring itself.

Having fully described my invention, what I claim as new and desire to secure by Letters Patent of the United States is:

1. In a shaft coupling, the combination with a pair of coupling members each comprising a hub for engaging with a shaft and an outwardly extending flange, said flanges being provided with aligning pin openings, non-metallic cylindrical connecting pins extending through said openings and projecting at each end beyond the adjacent flanges, each of said pins consisting of a single piece of material and provided in the projectng part of each end with a circumferential groove, and a pair of spring retaining rings engaging with the grooves at the inner side of said projecting ends.

2. In a shaft coupling, the combination with a pair of coupling members each comprising a hub for engaging with a shaft and an outwardly extending flange, said flanges being provided with aligning pin openings, non-metallic cylindrical connecting pins extending through said openings and projecting at each end beyond the adjacent flanges, each of said pins consisting of a single piece of material and provided in the projecting part of each end with a circumferential groove, and a pair of spring retaining rings engaging with the inner edge of the grooves, each of said springs being provided at each end with an outwardly curved hook extending partially around the projecting end of one of said pins.

In testimony whereof, I hereunto affix my signature, this 9th day of November, 1928.

ALBERT F. FROUSSARD.